United States Patent

[11] 3,607,967

| [72] | Inventor | Duane D. Shaul<br>Beaverton, Oreg. |
|---|---|---|
| [21] | Appl. No. | 856,748 |
| [22] | Filed | Sept. 10, 1969 |
| [45] | Patented | Sept. 21, 1971 |
| [73] | Assignee | Phillips Petroleum Company |

[54] SOLVENT EXTRACTION OF ISOPRENE
5 Claims, 1 Drawing Fig.
[52] U.S. Cl.................................................. 260/681.5,
    208/325, 208/334, 260/674 SE
[51] Int. Cl....................................................C07c 11/18,
    C07c 7/10, C10g 21/16, C10g 21/22
[50] Field of Search........................................... 260/681.5,
    674 SE; 208/325, 334

[56] References Cited
UNITED STATES PATENTS

| 2,360,859 | 10/1944 | Evans et al..................... | 208/240 |
| 2,407,820 | 9/1946 | Durrum......................... | 260/674 |

Primary Examiner—Delbert E. Gantz
Assistant Examiner—G. E. Schmitkons

ABSTRACT: A method of separating isoprene from isoamylenes by solvent extraction in which an isoprene-isoamylene stream is contacted with a solvent comprising sulfolane and methyl carbitol, the improvement comprising employing as the solvent about equal weight percentages of sulfolane and methyl carbitol in a mixture containing about 3.5 percent water.

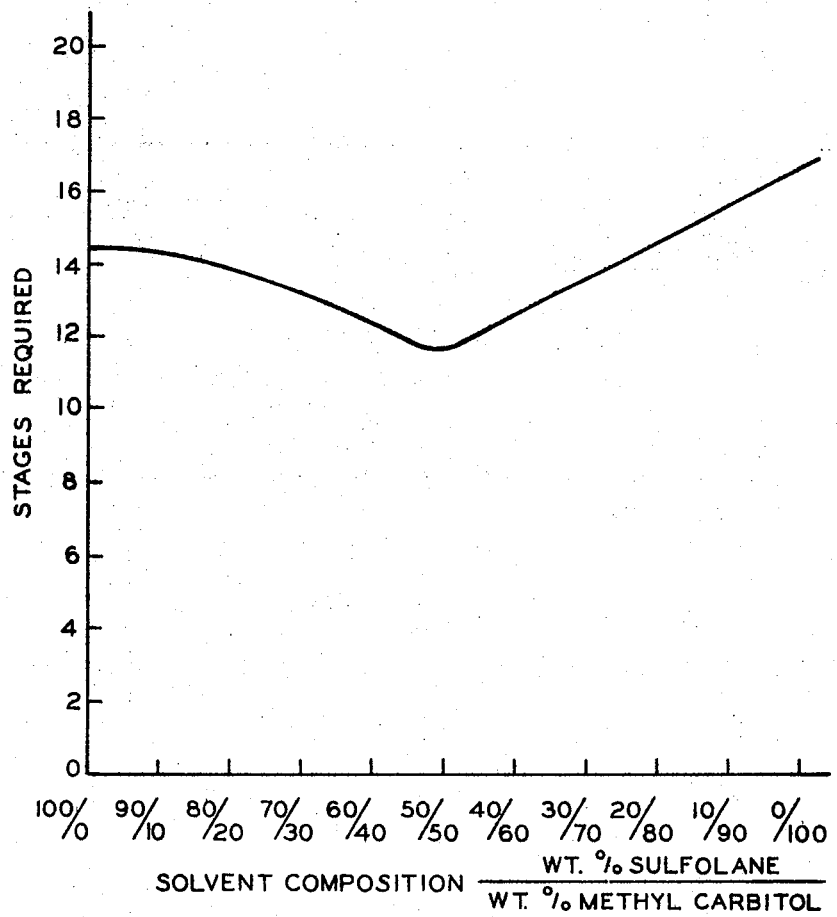

SOLVENT EXTRACTION OF ISOPRENE

This invention relates to solvent extraction.

One of its more specific aspects, this invention relates to the solvent extraction of isoprene.

Solvent extraction processes for the separation of mixtures of two or more compounds are well known. One such process involves the separation of isoprene from isoamylenes. Use of sulfolane for this purpose is known as is the use of diethylene glycol monoalkyl ethers in combination with the sulfolane. The process generally consists of the countercurrent contacting of the isoprene-containing hydrocarbon stream with the sulfolane-containing solvent in a contactor to produce a raffinate phase and an extract phase comprising the sulfolane-containing solvent and a principal portion of the isoprene, the isoprene being separated from the solvent in a subsequent step, the sulfolane-containing solvent thereafter being recycled to the contractor.

It has now been determined that there exist sulfolane-containing solvent compositions which possess distinct advantages over those heretofore employed and the use of such compositions in liquid-extraction processes is distinctly advantageous. The method of this invention provides in the process for the separation of isoprene by contacting an isoprene-containing stream with a sulfolane-containing solvent to produce a raffinate and an extract comprising a principal portion of the isoprene, and recovering the isoprene from the extract, the improvement comprising employing as the sulfolane-containing solvent a composition of from about 60 to about 40 weight percent sulfolane and about 40 to about 60 weight percent methyl carbitol (diethylene glycol monomethyl ether), the total solvent containing from about 3 to about 5 weight percent water.

Investigations as to the desired ratio of the components comprising a blend of two selective solvents generally produce a straight line relationship relating the efficiency of the system when employing one of the pure components with the efficiency of the system when employing the other pure component. Mixtures of the two components can be expected to have efficiencies falling on the straight line so formed.

In the present instance, however, mixtures of the solvents concerned have been found to deviate from such a straight line relationship and to indicate a particular composition which shows a minimum number of required theoretical contact stages. Conversely expressed, a mixture of two solvents has been discovered which possesses a maximum efficiency of extraction in respect to both the selectivity of the solvent for the hydrocarbon component and the solubility of the hydrocarbon component in the solvent. The former is primarily determinative of the number of contact stages required. The latter is largely determinative of the solvent circulation rate which must be employed. Accordingly, it has been determined that the selective solvent composition defined herein provides a solvent of high selectivity and solubility and one possessing minimum difficulty in respect to its separation from the extract hydrocarbon in whatever subsequent separation step may be employed.

Accordingly, it is an object to this invention to provide a more efficient solvent extraction process for the recovery of isoprene.

It is another object of this invention to provide a more efficient solvent for the countercurrent extraction of isoprene.

A comparison of the solvent employed in the method of this invention with other solvent compositions and with sulfolane and methyl carbitol, individually, is shown in the attached drawing.

The attached drawing illustrates the effectiveness of various solvent compositions of sulfolane and methyl carbitol, containing 3 weight percent water as regard the number of theoretical stages required to effect a specific separation. It is seen that with 100 weight percent sulfolane, slightly in excess of 14 theoretical stages would be required. Similarly, with 100 weight percent methyl carbitol, about 17 theoretical stages would be required. Intermediate mixtures of the two solvents would, accordingly, be expected to fall on a straight line connecting these two points. Surprisingly, however, such is not the case, it being seen that instead at a composition of about equal weight percentages of sulfolane and methyl carbitol, less than 12 theoretical stages are required; that is to say, that at such a composition, the maximum extraction efficiency of the possible solvent compositions is realized.

These data were developed under identical conditions based upon the hydrocarbon feed stream containing 40 weight percent isoprene and 60 weight percent 2-methyl butene-2 contacted with the solvent compositions indicated to produce a constant quality raffinate containing 10 volume percent isoprene and a constant quality extract containing 70 volume percent isoprene. The solvent to hydrocarbon feed ratio was maintained at a constant valve of 15 volumes per volume. The use of 2-methyl butene-2 as a representative isoamylene facilitated analyses. Other isoamylenes would be presented in commercial feedstreams but would behave like the 2-methyl butene-2 used in the tests.

From these data it will be seen that preferred solvent compositions, requiring a minimum number of theoretical stages are those comprising from about 40 to 60 weight percent sulfolane and from about 60 to 40 weight percent methyl carbitol, the total mixture containing about 3 to about 5 weight percent water, preferably about 3.5 weight percent water.

More specifically, the optimum solvent composition is one comprising about 50 weight percent sulfolane and about 50 weight percent methyl carbitol, the total mixture containing about 3.5 weight percent water.

The solvent concerned is employed in any conventional manner in the extraction process. Generally the hydrocarbon containing the isoprene is passed in countercurrent contact with the solvent within a first zone from which is recovered a raffinate diminished in isoprene and an extract comprising the solvent and the principal portion of the isoprene introduced in the feed. The extract is introduced into a second zone wherein, by fractionation or other methods, an isoprene product is recovered from the solvent. The lean or stripped solvent is recycled to the first zone while some portion of the isoprene product can be introduced into the first zone as reflux.

Typical operating conditions include a fist zone contactor temperature of about 130° F. and a pressure of 40 p.s.i.g. and a second zone stripper temperature of about 340° F. at the reboiler and about 190° F. at the overhead temperature at a pressure of about 15 p.s.i.g.

The method of this invention employs conventional lean solvent to hydrocarbon feed ratios, generally from about 7:1 to abut 20:1 It further allows operation in conventional apparatus with any isoprene-containing feedstocks containing from about 10 percent to about 75 percent isoprene. In the particular pilot plant runs on which the data illustrated in the FIGURE are based, the feed contained about 26 percent isoprene of which about 93 percent was reconverted as the product separated from the solvent.

The typical composition of the feed, raffinate and recovered isoprene stream, all on a solvent-free basis in the above runs was as follows:

| Component | Feed | Raffinate | Recovered isoprene |
|---|---|---|---|
| 2-methyl butene-1 plus trans butene-2 | 6.45 | 7.98 | 4.33 |
| 2-methyl butene-2 | 65.23 | 82.55 | 29.54 |
| Isoprene | 26.00 | 5.00 | 63.91 |
| Other | 2.32 | | |

It will be noticed from these data that the recovery of the isoprene from the feed was particularly effective especially in view of the high percentage of 2-methyl butene-2 contained in the original feed stream, these data indicating that about 93 percent of the 2-methyl butene-2 stream was separated into the raffinate with only about 7 percent being recovered in the recovered isoprene stream while about 93 percent of the isoprene was separated into the recovered isoprene stream, only about 7 percent being lost to the raffinate stream. Use of the contactor with additional stages would provide increased isoprene recovery as well as higher isoprene purities in the extract product. The pilot plant tests demonstrate the effectiveness of the preferred solvent blend.

It will be appreciated that various modifications can be made to this invention in light of the foregoing disclosure. Such, however, are considered as being within the scope of the invention.

What is claimed is:

1. In the solvent extraction of isoprene from a stream comprising isoprene and isoamylenes by contacting the isoprene-containing stream with a sulfolane-containing solvent to produce a raffinate and an isoprene-rich extract, the improvement comprising employing as the solvent a mixture comprising from about 60 to about 40 weight percent sulfolane and about 40 to about 60 weight percent methyl carbitol, the total mixture containing from about 3 to about 5 weight percent water.

2. The process as defined in claim 1, in which the mixture comprises about 50 weight percent sulfolane and about 50 weight percent methyl carbitol and about 3.5 weight percent water.

3. The process as defined in claim 1, in which the solvent to isoprene-containing stream ratio is about 15 volumes per volume.

4. The process as defined in claim 1, in which the lean solvent to hydrocarbon feed volume ratio is from about 7:1 to about 20:1.

5. The process as defined in claim 1, in which the isoprene-containing stream contains 2-methyl butene-2.